US008246728B2

(12) United States Patent
Hilberer

(10) Patent No.: US 8,246,728 B2
(45) Date of Patent: Aug. 21, 2012

(54) COMPRESSED-AIR SUPPLY DEVICE AND VALVE HOUSING

(75) Inventor: Eduard Hilberer, Hockenheim (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 357 days.

(21) Appl. No.: 12/555,230

(22) Filed: Sep. 8, 2009

(65) Prior Publication Data

US 2010/0199844 A1    Aug. 12, 2010

Related U.S. Application Data

(63) Continuation of application No. PCT/EP2008/001856, filed on Mar. 7, 2008.

(30) Foreign Application Priority Data

Mar. 8, 2007    (DE) .......................... 10 2007 011 246

(51) Int. Cl.
*B60T 17/00*    (2006.01)
*B01D 53/26*    (2006.01)

(52) U.S. Cl. .......... 96/134; 96/396; 55/431; 55/DIG. 17

(58) Field of Classification Search .................... 96/134, 96/189, 396; 55/428, 431, DIG. 17, DIG. 35
See application file for complete search history.

(56) References Cited

U.S. PATENT DOCUMENTS

| 4,487,617 A * | 12/1984 | Dienes et al. ................... 96/113 |
| 4,544,385 A * | 10/1985 | Tanaka ............................. 96/114 |
| 5,002,593 A * | 3/1991 | Ichishita et al. ................. 96/137 |
| 5,286,283 A * | 2/1994 | Goodell .......................... 96/113 |
| 5,522,150 A * | 6/1996 | Schultz ............................. 34/80 |
| 6,540,308 B1 | 4/2003 | Hilberer |
| 6,730,143 B1 * | 5/2004 | Nichols et al. .................. 95/118 |
| 7,544,234 B2 * | 6/2009 | Fornof .......................... 96/117.5 |
| 7,727,313 B2 * | 6/2010 | Blackwood et al. ............ 96/134 |
| 7,892,329 B2 * | 2/2011 | Milomo .......................... 96/134 |
| 2004/0094036 A1 * | 5/2004 | Nichols et al. .................. 95/148 |
| 2006/0123743 A1 | 6/2006 | Heer |

FOREIGN PATENT DOCUMENTS

DE    31 33 112 A1    3/1983

(Continued)

OTHER PUBLICATIONS

International Search Report dated Sep. 19, 2008 with English translation (four (4) pages).

(Continued)

*Primary Examiner* — Frank Lawrence, Jr.
(74) *Attorney, Agent, or Firm* — Crowell & Moring LLP

(57) ABSTRACT

A compressed air-supply device for a utility vehicle includes a valve housing and an exchangeable air-drying cartridge. The air-drying cartridge has a filter device which cleans the air flowing from the valve housing into the air-drying cartridge. The filter device separates the pre-filter area facing the valve housing from the post-filter area that faces the air-drying cartridge and in which foreign particles captured by the filter device are collected. A non-return valve is provided parallel to the filter device, which prevents air flowing from the pre-filter area to the post-filter area but allows the air flow from the post-filter area to the pre-filter area. The non-return valve is arranged in the valve housing.

6 Claims, 2 Drawing Sheets

FOREIGN PATENT DOCUMENTS

| | | |
|---|---|---|
| DE | 36 06 817 A1 | 9/1987 |
| DE | 198 35 638 A1 | 2/2000 |
| DE | 103 29 401 A1 | 1/2005 |
| DE | 10 2004 059 508 B3 | 6/2006 |
| EP | 1 495 934 B1 | 1/2005 |
| GB | 2 201 356 A | 9/1988 |
| WO | WO 2004/103509 A2 | 12/2004 |

OTHER PUBLICATIONS

German Office Action dated Oct. 17, 2007 with English translation (eight (8) pages).

German Office Action dated Apr. 23, 2008 with English translation (four (4) pages).

* cited by examiner

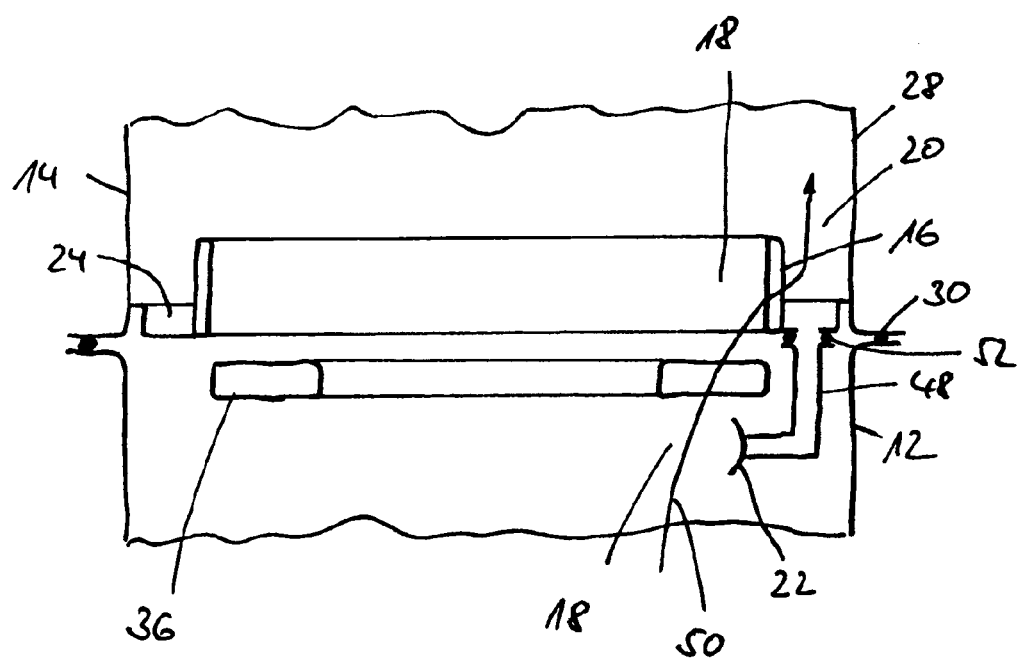

COMPRESSED-AIR SUPPLY DEVICE AND VALVE HOUSING

CROSS-REFERENCE TO RELATED APPLICATIONS

This application is a continuation of PCT International Application No. PCT/EP2008/001856, filed Mar. 7, 2008, which claims priority under 35 U.S.C. §119 to German Patent Application No. DE 10 2007 011 246.9, filed Mar. 8, 2007, the entire disclosures of which are herein expressly incorporated by reference.

BACKGROUND AND SUMMARY OF THE INVENTION

The invention relates to a compressed-air supply device for a utility vehicle, with a valve housing and with an exchangeable air drier cartridge. The air drier cartridge having a filter device which purifies air flowing out of the valve housing into the air drier cartridge. The filter device separates a pre-filter region facing the valve housing from a post-filter region which faces the air drier cartridge and in which foreign particles picked up by the filter device are collected. Parallel to the filter device, a non-return valve is provided, which prevents an air flow from the pre-filter region into the post-filter region and allows an air flow from the post-filter region into the pre-filter region.

The invention relates, furthermore, to a valve housing for a compressed-air supply device with an exchangeable air drier cartridge. The air drier cartridge has a filter device which purifies air flowing out of the valve housing into the air drier cartridge. The filter device separates a pre-filter region facing the valve housing from a post-filter region which faces the air drier cartridge and in which foreign particles picked up by the filter device are collected. Parallel to the filter device, a non-return valve is provided, which prevents an air flow from the pre-filter region to the post-filter region and allows an air flow from the post-filter region into the pre-filter region.

Such compressed-air supply devices with a valve housing and with an air drier cartridge are used in order to supply compressed-air consumers of a utility vehicle with dry and purified air. What may be considered as compressed-air consumers are, for example, the brake system or a pneumatic spring installation. The drying of the air in this case takes place by means of a desiccant present mostly as a granulate. Moreover, it is useful to remove foreign substances, for example compressor oil, from the compressed air.

This oil is supplied to the compressed-air supply device, together with the air, in a partially vaporous state of aggregation, and, because of the high temperatures and high pressures, it is in multiple cracked form. The substances therefore present are harmful to the components of a compressed-air installation. For example, cracked oils seriously lower the service life of sealing elements.

One example of a compressed-air supply device in which these foreign substances are removed from the compressed air supplied is disclosed in DE 103 29 401 A1. Here, a coalescence filter is provided, which purifies the compressed air flowing into the filter cartridge, the foreign particles extracted from the air accumulating in a post-filter region. So as to be able to empty the post-filter region from time to time, a non-return valve is provided parallel to the coalescence filter. This non-return valve makes it possible, by a discharge valve in the valve housing being opened, for the foreign particles to flow out and to be ejected into the atmosphere.

The non-return valve therefore comes into intensive contact with the collected foreign particles, thus making it necessary to manufacture the non-return valve from comparatively costly materials. This would be manageable per se in light of the overall costs of a compressed-air supply device. The problem, however, is that the air drier cartridge has to be exchanged from time to time. Consequently, the production of the non-return valve from costly material is not only reflected in the procurement costs of the compressed-air supply device, but especially also in the costs of the exchangeable drier cartridge. In terms of the overall costs of the air drier cartridge, however, the costs of the non-return valve constitute an appreciable proportion.

The object on which the invention is based is to make available a compressed-air supply device, so that the costs associated with the exchange of the air drier cartridge are reduced.

The invention builds on the generic compressed-air supply device in that the non-return valve is arranged in the valve housing. The non-return valve is thus preserved even in the event of a cartridge change. It therefore does not contribute to the costs incurred when the filter cartridge is exchanged.

Expediently, there is provision for the post-filter region to have a collecting duct for the foreign particles picked up by the filter device, at least one portion of the collecting duct defining a horizontal plane when the compressed-air supply device is in the installed uninclined state, and for the non-return valve to lie below the plane. This ensures that, at least when the utility vehicle is standing horizontally, a complete emptying of the collecting duct via the non-return valve can take place.

It is especially useful in this respect that, in the event of an inclination of the compressed-air supply device of up to 15 degrees with respect to the horizontal plane about any axis, the non-return valve lies on a lower vertical coordinate than the lowest point of the at least one portion, defining the horizontal plane, of the collecting duct. The collecting duct is thus emptied even when the utility vehicle is in an oblique position, for example when traveling up or down a hill.

The invention is developed in a particularly useful way in that the air drier cartridge has a cartridge housing receiving a desiccant box, and in that the cartridge housing is connected to the valve housing directly via a seal. Such compressed-air supply devices are also designated as open systems. In particular, the air drier cartridge is not equipped with a foot flange, via which closed systems are connected to the valve housing.

The invention is especially suitable for open systems, since a scavenging duct for transferring the foreign substances which have accumulated in the collecting duct of the drier cartridge into the valve housing can be implemented without any obstruction, that is to say, in particular, without a bypass or drilling through of a foot flange.

The invention builds on the generic valve housing in that the non-return valve is arranged in the valve housing.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 shows a diagrammatic illustration of the interface between an air drier cartridge and a valve housing of a compressed-air supply device according to the invention.

DETAILED DESCRIPTION OF THE DRAWINGS

Figure 1:
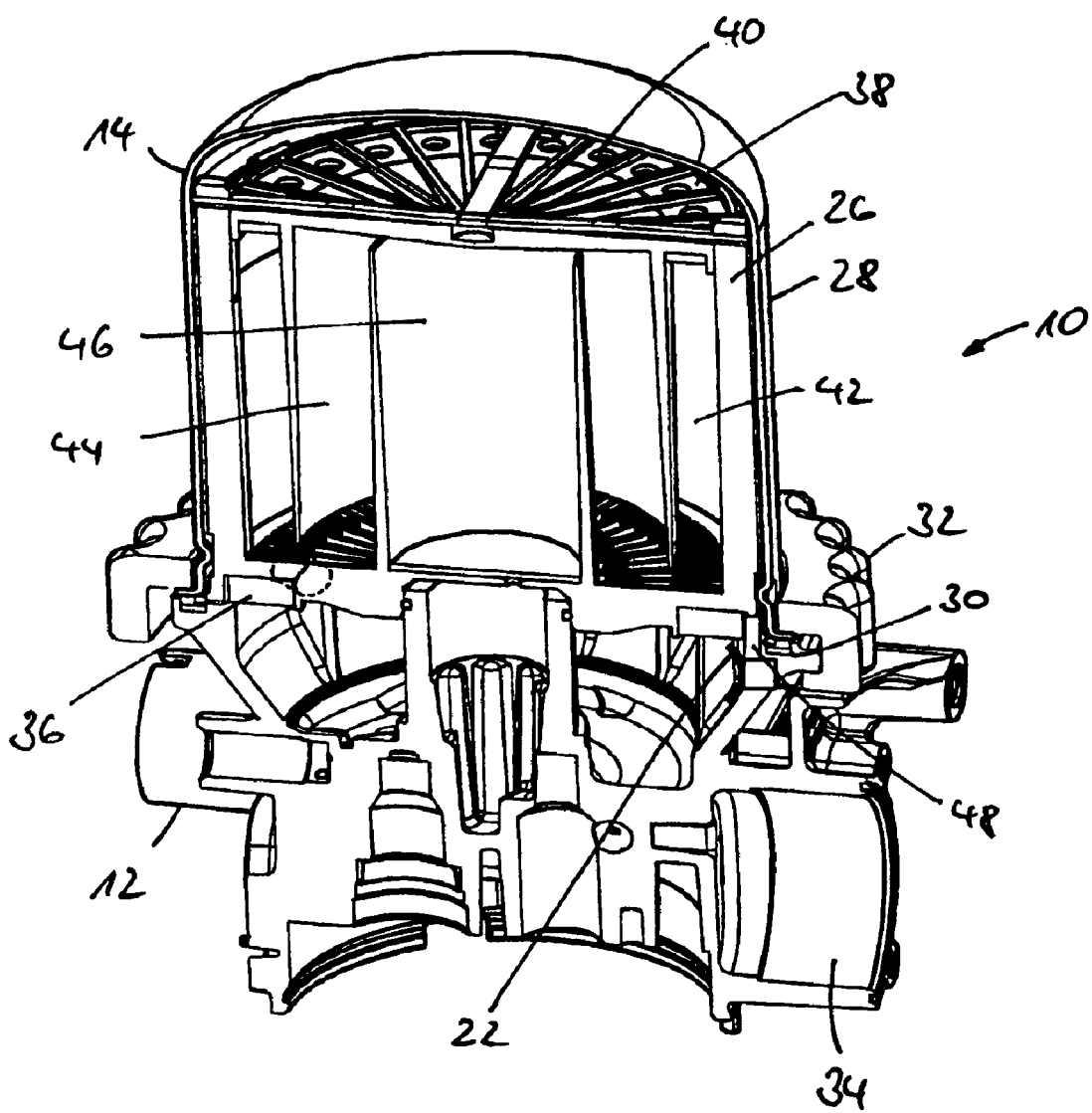
FIG. 1 shows a perspective sectional view of a compressed-air supply device according to the invention.

In the following description of the drawings, the same reference symbols designate identical or comparable components.

FIG. 1 shows a perspective sectional view of a compressed-air supply device according to the invention. The compressed-air supply device 10 illustrated comprises a valve housing 12 and an air drier cartridge 14. The air drier cartridge 14 or a housing 28 of the air drier cartridge 14 is connected directly to the valve housing 12 via a seal 30. In particular, the air drier cartridge 14 is not equipped with a foot flange which delimits the air drier cartridge 14 in the direction of the valve housing. The sealing force acting on the seal 30 is made available by a bayonet ring 32. A desiccant box 26 is arranged inside the housing 28 of the air drier cartridge 14.

When the compressed-air supply device 10 is in use, compressed air flows through an inlet 34 of the valve housing 12 into the latter. The compressed air is conducted through a pre-filter 36, in order subsequently to flow, in an interspace between the outsides of the desiccant box 26 and the inside of the housing 28, into a free space 38 above the desiccant box. Provided in the top side of the desiccant box are a multiplicity of orifices 40 which connect the free space 38 above the desiccant box to the interior of the latter. In particular, the compressed air flows out of the free space 38 via the orifices 40 and a first labyrinth region 42 of the desiccant box into the lower region of the desiccant box 26, where the air is then deflected in order to flow into a second labyrinth region 44. The compressed air, conducted upward there, is once again deflected in the upper region, in order then to flow through a central labyrinth region 46 downward in the direction of the valve housing 12 again. The dried compressed air is thus available in the air routes of the valve housing, so that it can be supplied from there to the compressed-air consumers. The desiccant box 26 is filled with granulate for the purpose of drying the compressed air. The pre-filter 36 serves for purifying the compressed air in terms of coarser impurities. A further filter device, which is not illustrated in FIG. 1, follows the pre-filter 36 in the flow direction of the compressed air, in order then also to free the compressed air of further impurities, in particular of oil and the like. The oil accumulates in the region of the air drier cartridge in a collecting duct, not illustrated in FIG. 1. With suitable pressure conditions in the compressed-air supply device, the oil can then flow from there via a scavenging duct 48 and a non-return valve 22 into the valve housing and from there out to a discharge. The non-return valve 22 is advantageously designed as a diaphragm valve, in which case the diaphragm should be manufactured from a material which for a long period of time withstands the chemical loading of the foreign substances to be repelled.

FIG. 2 shows a diagrammatic illustration of the interface between an air drier cartridge and a valve housing of a compressed-air supply device according to the invention. Here, the arrangement of the components involved in the purification of the compressed air and in the ejection of the foreign particles is illustrated diagrammatically. The compressed air 50 first flows through the pre-filter 36 in order then to flow thereafter through the filter device 16. The filter device 16 is preferably designed as a coalescence filter, the foreign particles separated by the coalescence filter 16 accumulating downstream of the coalescence filter 16 in the flow direction in a collecting duct 24. Within the framework of the present description, the entire region which is located upstream of the filter device 16 in the flow direction of the compressed air is designated as the pre-filter region, while the region downstream of the filter device 16 is designated as the post-filter region 20. In the valve housing 12, a scavenging duct 48 is provided, which is connected to the collecting duct 24 via a seal. The end of the scavenging duct 48 is sealed off by means of a non-return valve 22. The latter closes the scavenging duct 48 during the compressed-air conveyance phase in which the pressure in the pre-filter region 18 usually overshoots the pressure in the post-filter region 20. If, however, a discharge valve is opened, thus leading to the pressure drop in the pre-filter region 18, the pressure in the post-filter region 20 overshoots the pressure in the pre-filter region 18. The non-return valve 22 consequently opens, with the result that the foreign particles which have accumulated in the collecting duct 24 are ejected via the non-return valve 22. The scavenging duct 48 may be arranged entirely in the valve housing, in which case the scavenging duct 48 adjoins the collecting duct 24 via a seal 52. There may likewise be provision for part of the scavenging duct to be provided inside the air drier cartridge 14. It is essential merely that a pressure-tight connection between the collecting duct 24 and the valve housing is made available, so that, with corresponding pressure conditions, the described ejection of foreign particles can take place. This can easily be implemented in open systems, since a foot flange sealing off the drier cartridge is not present and therefore can be ignored in the design.

Expediently, the non-return valve 22 is arranged at a markedly lower level than the collecting duct 24. Thus, even an oblique position of the compressed-air supply device is permitted, without a complete emptying of the collecting duct 24 thereby being ruled out. In particular, inclinations of the vehicle of up to 15 degrees should still not impede a complete emptying of the collecting duct 24.

| Table of Reference Symbols |
| --- |
| 10 Compressed-air supply device |
| 12 Valve housing |
| 14 Air drier cartridge |
| 16 Filter device |
| 18 Pre-filter region |
| 20 Post-filter region |
| 22 Non-return valve |
| 24 Collecting duct |
| 26 Desiccant box |
| 28 Housing |
| 30 Seal |
| 32 Bayonet ring |
| 34 Inlet |
| 36 Pre-filter |
| 38 Free space |
| 40 Orifices |
| 42 Labyrinth region |
| 44 Labyrinth region |
| 46 Labyrinth region |
| 48 Scavenging duct |
| 50 Compressed air |
| 52 Seal |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A compressed-air supply device for a vehicle, comprising:
- a valve housing;
- an exchangeable air drier cartridge operatively arranged with respect to the valve housing, the air drier cartridge having a filter device which purifies air flowing out of the valve housing into the air drier cartridge;
- wherein the filter device separates a pre-filter region facing the valve housing from a post-filter region facing the air drier cartridge and in which foreign particles picked up by the filter device are collected; and
- a non-return valve arranged parallel to the filter device, the non-return valve preventing an air flow from the pre-filter region into the post-filter region and allowing an air flow from the post-filter region into the pre-filter region, wherein the non-return valve is operatively arranged in the valve housing,
- wherein
  - the post-filter region has a colleting duct for the foreign particles picked up by the filter device, at least one portion of the collecting duct defining a horizontal plane when the compressed-air supply device is in an installed, uninclined, state, and
  - the non-return valve is operatively arranged below the horizontal plane.

2. The compressed-air supply device according to claim 1, wherein in an event of an inclination of the compressed-air supply device of up to 15 degrees with respect to the horizontal plane about any axis, the non-return valve is on a lower vertical coordinate than a lowest point of the at least one portion of the collecting duct that defines the horizontal plane.

3. The compressed-air supply device according to claim 1, wherein the air drier cartridge comprises a cartridge housing receiving a desiccant box, the cartridge housing being connectable to the valve housing directly via a seal.

4. The compressed-air supply device according to claim 1, wherein the air drier cartridge comprises a cartridge housing receiving a desiccant box, the cartridge housing being connectable to the valve housing directly via a seal.

5. The compressed-air supply device according to claim 2, wherein the air drier cartridge comprises a cartridge housing receiving a desiccant box, the cartridge housing being connectable to the valve housing directly via a seal.

6. The compressed-air supply device according to claim 1, wherein the compressed-air supply device is a commercial vehicle compressed-air supply device.

* * * * *